United States Patent [19]

Iwata et al.

[11] Patent Number: 4,773,290
[45] Date of Patent: Sep. 27, 1988

[54] CALIPER MACHINING APPARATUS AND METHOD

[75] Inventors: Yukio Iwata; Shigenori Matsumoto, both of Saitama, Japan

[73] Assignee: Akebono Brake Industry Co., Ltd., Tokyo, Japan

[21] Appl. No.: 9,970

[22] Filed: Feb. 2, 1987

[30] Foreign Application Priority Data

Feb. 1, 1986 [JP] Japan .................... 61-20530
Feb. 10, 1986 [JP] Japan .................... 61-27657
Feb. 10, 1986 [JP] Japan .................... 61-27658
Feb. 22, 1986 [JP] Japan .................... 61-24790[U]

[51] Int. Cl.⁴ ............................... B23B 41/00
[52] U.S. Cl. ............................ 82/1.2; 82/4 A
[58] Field of Search .............. 82/1.2, 1.4, 4 A

[56] References Cited

U.S. PATENT DOCUMENTS

| | | | |
|---|---|---|---|
| 613,596 | 11/1898 | Patzschke | 82/1.2 |
| 2,276,727 | 3/1942 | Johnson | 82/1.2 |
| 3,169,416 | 2/1965 | Carlson et al. | 82/1.4 |
| 3,208,312 | 9/1965 | Heuser | 82/1.2 |
| 3,237,486 | 3/1966 | Gilbert et al. | 82/1.2 |
| 4,599,769 | 7/1986 | Latzko et al. | 29/26 A |
| 4,607,549 | 8/1986 | Krempel | 82/2 E |
| 4,620,464 | 11/1986 | Vasilcchenko | 82/1.2 |

Primary Examiner—Frederick R. Schmidt
Assistant Examiner—William E. Terrell
Attorney, Agent, or Firm—Sughrue, Mion, Zinn, Macpeak, and Seas

[57] ABSTRACT

A caliper machining apparatus for machining a caliper for a disc brake is disclosed which comprises: a cutter for cutting the caliper, a facing mechanism for positioning and facing the cutter relative to the caliper. The facing mechanism includes a hollow rotary spindle, a facing head fixed to the rotary spindle, a slider movable only in a diametric direction of the facing head, and slidingly moved in eccentric relation with a rotary center of the rotary spindle and a facing shaft passing through the rotary spindle. The facing shaft is allowed to rotate with the rotary spindle but to be displaceable in an axial direction relative to the rotary spindle. The rotary spindle is rotated by a main motor. The facing shaft is moved in the axial direction by the rotation of a facing motor.

4 Claims, 8 Drawing Sheets

FIG. 10
FIG. 11
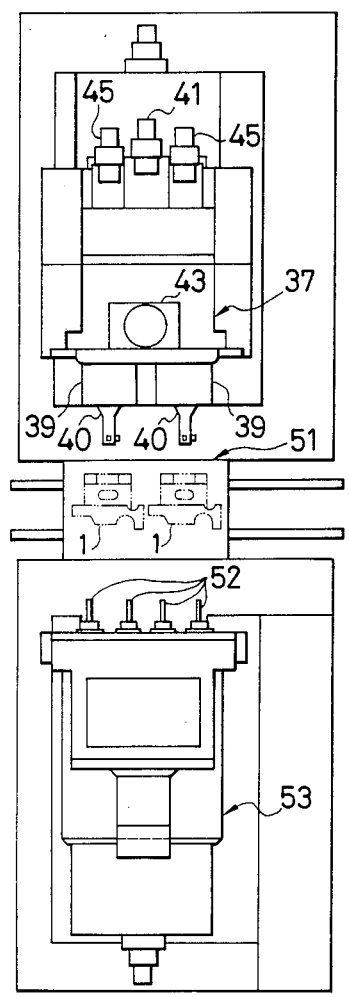
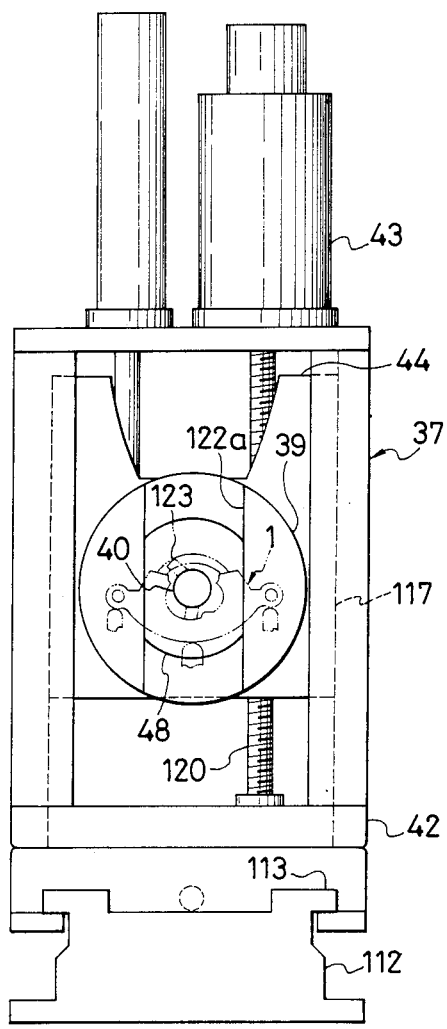

1

CALIPER MACHINING APPARATUS AND METHOD

BACKGROUND OF THE INVENTION

This invention relates to an apparatus and a method for machining a caliper for use in an automobile brake and more particularly to an arrangement devised to machine a caliper cylinder hole, a sealing channel and the like without replacement of jigs. The invention is applicable to machining calipers for use in disc brakes.

Heretofore, a special machine has been employed to machine each of the principal portions of a caliper such as its cylinder hole, claw, etc. by setting the caliper to a jig so arranged as to hold the work piece in position without impeding machining.

In the case of the aforesaid conventional machining, there is needed a special jig on a caliper machining basis and therefore the jig must be replaced with for each different type caliper. In consequence, a long setting time is required and this makes it difficult to implement automatic machining.

SUMMARY OF THE INVENTION

In order to overcome the above-noted defects inherent in the prior art, according to the present invention, there is provided a caliper machining apparatus for machining a caliper for a disc brake, comprising: a cutting means for cutting said caliper; a facing means for positioning and facing said cutting means relative to said caliper, said facing means including a hollow rotary spindle, a facing head fixed to said rotary spindle, a slider movable only in a diametric direction of said facing head, and slidingly moved in eccentric relation with a rotary center of said rotary spindle and means for allowing said facing shaft to rotate with said rotary shaft but to be displaceable in an axial direction relative to said rotary spindle; a rotary spindle rotating means for drivingly rotating said rotary spindle; and a facing shaft moving means for drivingly moving said facing shaft in the axial direction.

Also, according to the present invention, there is provided a caliper machining apparatus for machining a caliper for a disc brake, comprising: a cutting means for cutting said caliper; a facing means for positioning and facing said cutting means relative to said caliper, said facing means including a hollow rotary spindle, a facing head fixed to said rotary spindle, a slider movable only in a diametric direction of said facing head, whereby said slider may be slidingly moved in eccentric relation with a rotary center of said rotary spindle, and a facing shaft passing through said rotary spindle, a rotary spindle rotating means for drivingly rotating said rotary spindle; a facing shaft rotating means for drivingly rotating said facing shaft; a screw means for threadedly coupling said facing shaft rotating means and said facing shaft to each other; and an asynchronously rotating means for generating a difference in rotational speed between said facing shaft rotating means and said rotary spindle rotating means whereby said facing shaft is displaceable in an axial direction.

Also, according to the invention, in a method for machining a caliper for a brake, said caliper having a pair of pin holes, a cylinder hole and a claw, said method comprising the steps of setting said caliper on a workpiece mount with the claw opening upward, and cutting the inner peripheral portions of the cylinder hole while using a cutter fitted to a rotary spindle of a cutting machine, said spindle being movable in a radial direction of said spindle, said spindle fitted to said cutting machine being so arranged as to be capable of moving transversely and axially of said cylinder hole of said caliper.

BRIEF DESCRIPTION OF THE DRAWINGS

In the accompanying drawings:

FIG. 10 is a plan view showing the arrangement of a machining apparatus of the invention;

FIG. 11 shows an arrangement of a facing mechanism of the invention;

DETAILED DESCRIPTION OF THE PREFERRED EMBODIMENTS

Figure 1:
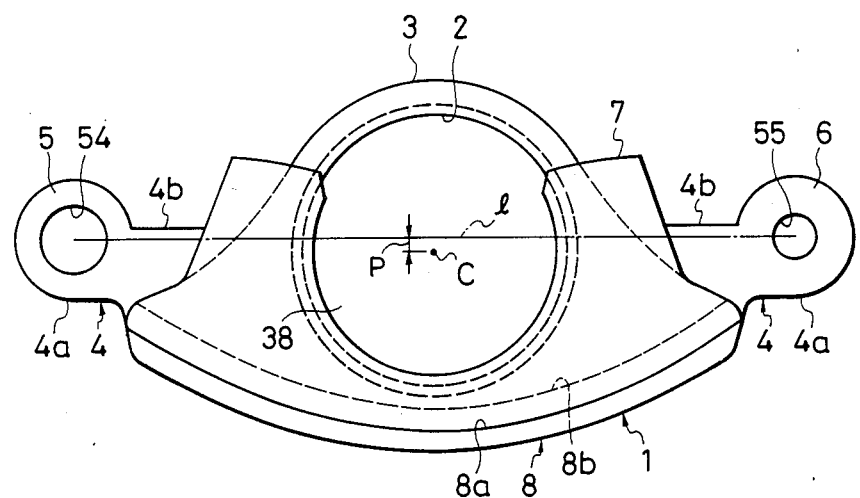
FIG. 1 is an elevational view of a caliper.
Figure 2:
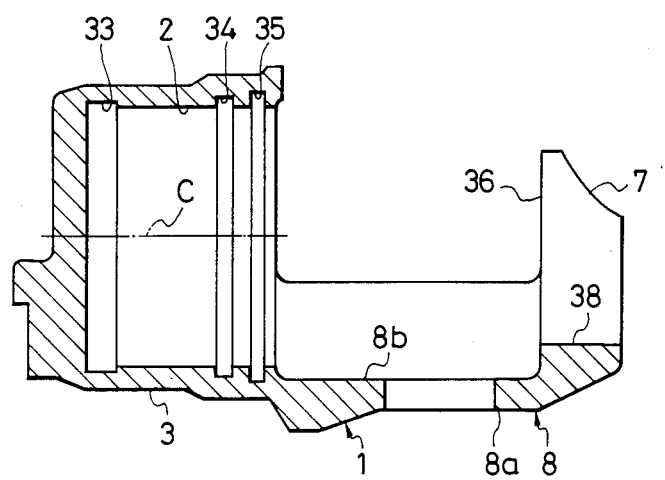
FIG. 2 is a vertical sectional side view of the caliper shown in FIG. 1.

Referring to the accompanying drawings, an embodiment of the present invention will now be described. FIGS. 1 and 2 are an elevational view and a vertical sectional side view of a caliper 1 including a cylinder 3 having a cylinder hole 2, left and right pin supports 5 and 6 formed outside support arms 4 extending from the cylinder 3 to the left and right pin supports 5 and 6, a claw 7 located opposite to the cylinder hole 2 and a partially cylindrical coupler 8 coupled to the cylinder 3 and to the claw 7. A machining apparatus generally indicated by reference numeral 9 in FIGS. 3 and 4 comprises left and right supports (a) and (b) for supporting both undersurfaces 4a of left and right support arms 4 of the caliper 1; a central support (c) for supporting the left and right central undersurfaces 8a of the coupler 8; surface pressers (A) and (B) for pressing the caliper 1 against both the supports (a) and (b) in abut with both surfaces 4b of the support arm 4; a side edge support (f) for supporting one of the side edge 8c of the coupler 8; a side edge presser (F) for pressing the caliper 1 against the side edge support (f) in abutment with the other side edge 8d of the coupler 8; left and right underside supports (d) and (e) for supporting both undersides 7a of a claw 7; and end face pressers (D) for pressing the caliper 1 against both the underside supports (d) and (e) in abutment with the end face 3a of the cylinder 3.

The surface pressers (A) and (B), the side edge presser (F) and the end face pressers (D) and (E) illustrated are so arranged that the above-described press-operation is performed by tightening vertical bolts. The surface pressers (A) and (B) are operated in the same manner. As shown in FIG. 4 schematically illustrating in its upper right portion the top surface presser (B) in vertical cross-section, a presser piece 14 is fitted into a clamp bolt 11 buried in the jig body 10 through a spring 12 and a thrust bearing 13 so that the presser piece 14 may rotate through about 90° around the thrust bearing 13. A clamp nut 16 is tightened, the top surface presser (B) fitted to the presser piece 14 by a bolt 11 is caused to press the surface 4b of each support arm 4 while compressing the spring 12. The pressure piece 14 may be removed from the surface 4b by loosening the clamp nut 16 and revolving the presser piece 14 counterclockwise through about 90° from the position shown in FIG. 3.

Figure 3:
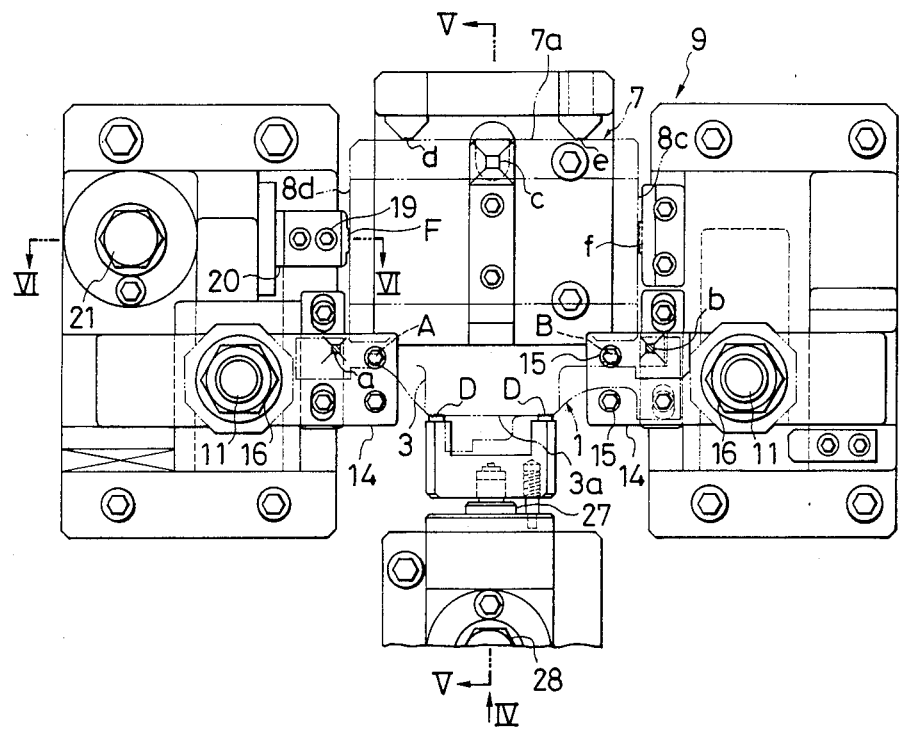
FIG. 3 is a partially omitted plan view of a machining apparatus of the present invention.
Figure 4:
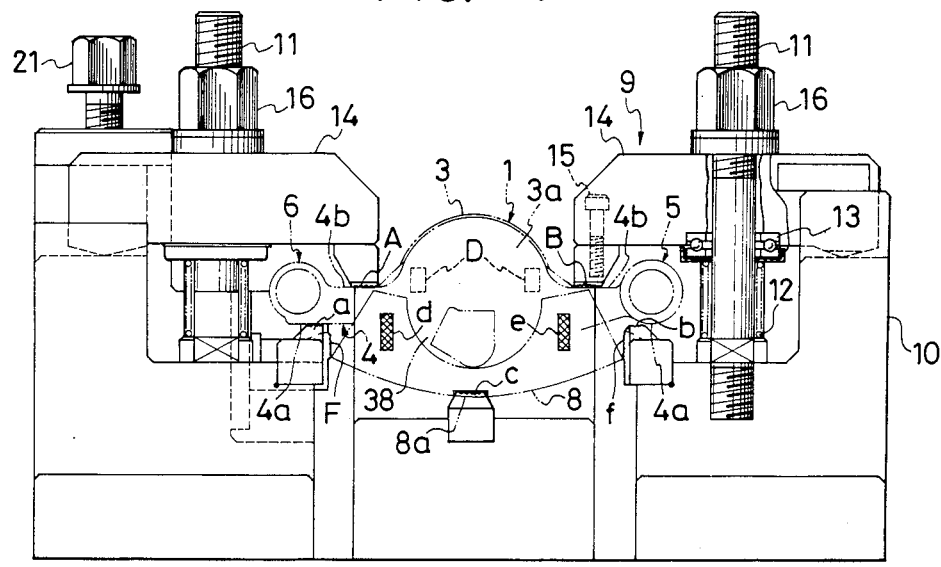
FIG. 4 is a diagram as viewed in the direction IV of FIG. 3
Figure 6:
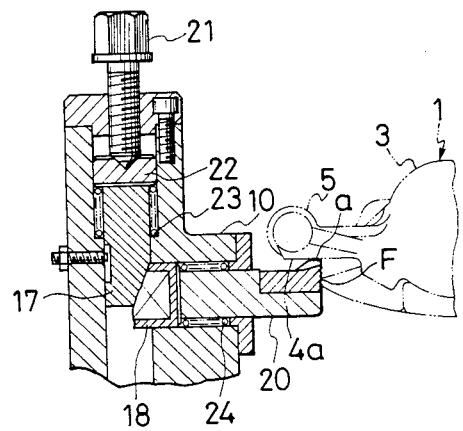
FIG. 6 is a sectional view taken along the line VI—VI of FIG. 3.

The side edge presser (F) shown in FIG. 6 as a sectional view taken along the line VI—VI of FIG. 3 is fitted in the jig body 10 by fitting a vertical wedge 17 and a transverse wedge 18 in the jig body 10 and making a presser piece 20, fixed to the side edge presser (F) with a bolt 19, abut against the transverse wedge 18 while making a vertical presser piece 22, pressed by a clamp bolt 21, abut against the vertical wedge 17. As the clamp bolt 21 is tightened, the presser piece 20 is pressed to the right in FIG. 6 against springs 23 and 24.

Figure 5:
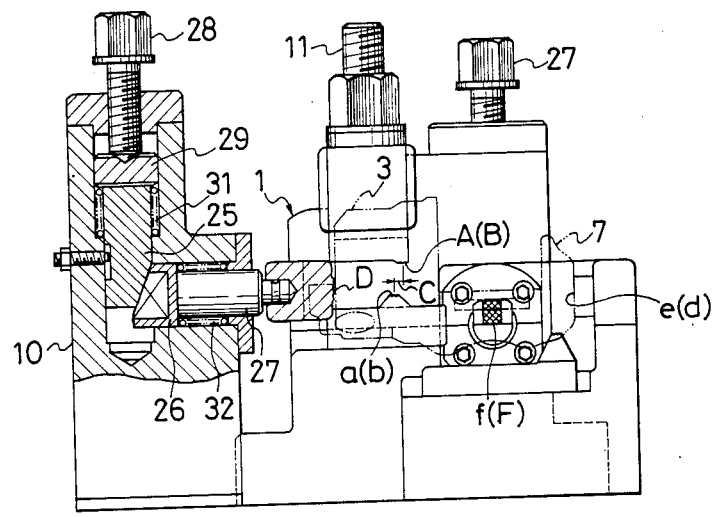
FIG. 5 is a cutaway view taken along the line V—V of FIG. 3.

The end face presser (D) shown in FIG. 5 which is a fragmentary sectional view taken along the line V—V of FIG. 3 is fitted in the jig body 10 by fitting a vertical wedge 25 and a transverse wedge 26 in the jig body 10, making a presser piece 27, fixed to the end face presser (D), abut against the transverse wedge 26 while making a vertical presser piece 29, pressed by a clamp bolt 28, abut against the vertical wedge 25. As the clamp bolt 28 is tightened, the presser piece 27 is pressed to the right in FIG. 5 against springs 31 and 32. Both the supports (a) and (b), the central supports (c), the side edge support (f), the underside supports (d), and (e) are removably fitted to the jig body 10 with mounting bolts, respectively.

A description will subsequently be given of an example of the process of cutting the principal portions such as the cylinder hole 2, the back relief portion 33, the sealing channel 34, the boot channel 35 and the inside 36 of the claw of the caliper 1.

Figure 7:
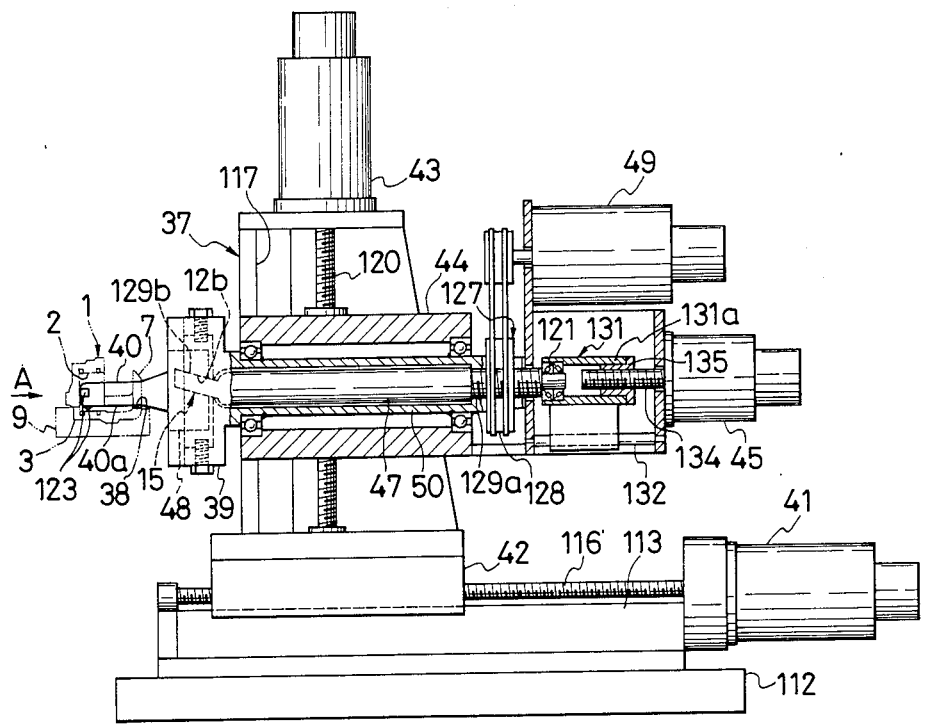
FIG. 7 is a vertical sectional side view of the principal portion of a boring machine according to the invention.

FIG. 7 is a vertical sectional side view of the principal portion of a boring machine 37. The caliper 1 with its claw opening 38 upward is set to the machining jig 9 with the claw 7 located close to a facing head 39 and the cylinder 3 away from a facing head 39 and the thinnest shank 40a of a cutter 40 is moved in and out of a claw opening 38 while the cutter 40 is rotated during the machining step. The cutter 40, together with a saddle 42, is driven by an axial feed servo motor 41 and moved in and out of the cylinder hole 2 and a vertical feed servo motor 43 is driven so that a feed unit 44 as well as the cutter 40 is aligned with the axis of the cylinder hole 2. A facing motor 45 is driven to move a facing shaft 47 in the axial direction of FIG. 7 so that a slider 48 with the cutter 40 and fitted into the channel of a facing head 39 makes the cutter 40 eccentric toward its outer periphery relative to the facing head 39. A spindle 50 is driven by a main shaft rotating servo motor 49 and rotates the facing shaft together with slider 48 and the cutter 40, whereby the eccentric action of the cutter 40 allows the principal portion to be cut to a predetermined inner diameter with the cutting diameter thus adjusted.

It is preferable that the maching of the principal portions such as the cylinder hole 2 and the back relief portion 33 is performed as follows. The rough cutting of the cylinder hole 2, the cutting of the back relief portion 33 and the medium finish cutting of the cylinder hole 2 are made in a first step; the rough and finish cutting of the boot channel 35 and the rough cutting of the sealing channel 34 are made in a second step; and the finish cutting of the cylinder hole 2 and the sealing channel 34 are made in a third step.

Figure 8:
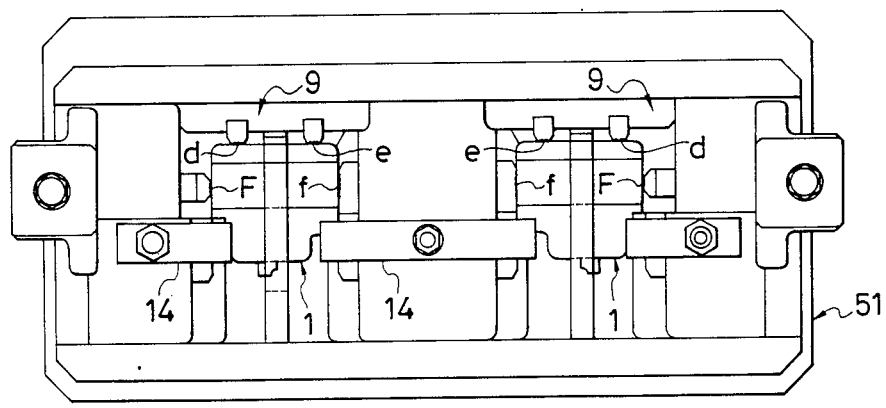
FIG. 8 is a plan view of a workpiece mount according to the invention.
Figure 9:
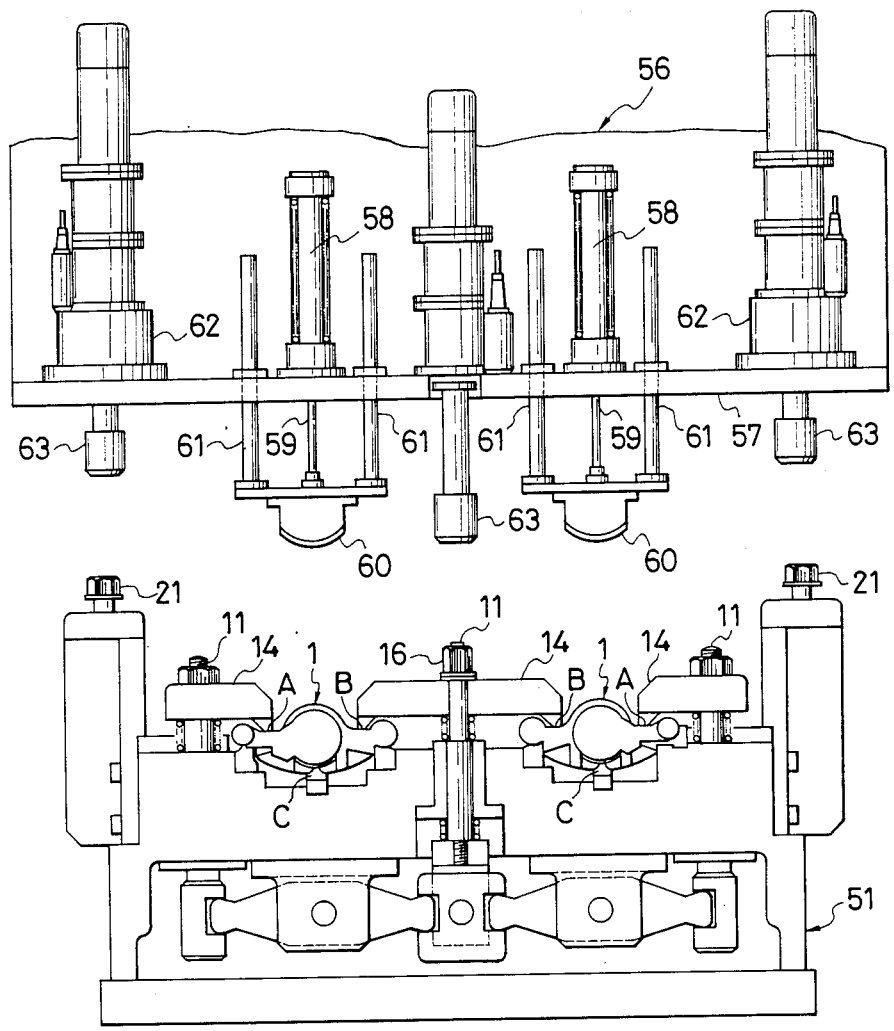
FIG. 9 is an elevational view of the workpiece mount shown in FIG. 8.

Referring to FIGS. 8 to 10 according to the present invention, on one side of a workpiece mount 51 carrying a pair of calipers 1, a boring machine 37 is equipped with a pair of cutters 40. The workpiece mount 51 has the same function as that of the aforesaid machining jig 9. The boring machine 37 is provided with the axial feed servo motor 41 and the vertical feed servo motor 43 for feeding the pair of cutters 40 axially and vertically. On the other side of the workpiece mount 51, there is provided a drilling machine 53 equipped with axially movable four drills 52. By intermittently moving the workpiece mount 51, the drilling machine 53 is used to cut the left and right pin holes 54 and 55 of the caliper 1, whereas the boring machine 37 is adapted to cut the inner diameter portions of the cylinder hole 2 and the boot channel 35 synchronously and continuously. If the height of the center line 1 of the left and right pin holes are set even at all times using a workpiece mount 51 for calipers having different specifications, numerically controlled machining can be performed for the calipers 1 having different offset P by driving the vertical feed servo motor 43 to place the cutters 40 and the cylinder holes 2 in alignment in accordance with the same program.

A jig clamp device 56 shown in FIG. 9 is designed to quickly set the caliper on the workpiece mount 51, wherein each caliper positioning block 60 is fitted to a piston 59 of a cylinder 58 fitted to a clamp head 57 and the caliper 1 is set in position by pressing downwardly the inner face of the coupler 8 of the caliper 1 through the caliper positioning block 60 guided by guide bars 61. The clamp bolt 21 and the clamp nut 16 are clamped or loosened by the rotation of nut drivers 62 fitted to the clamp head 57.

The caliper machining jig is thus constructed according to the present invention, the support arms 4, the undersurfaces 4a and the central under surface 8a of the coupler 8 of the caliper 1 are supported by both the supports (a) and (b), and the central support (c) of the machining jig 9. The surfaces 4b, 4b of the support arm 4 are pressed by the surface pressers (A) and (B) and one side edge 8c of the coupler 8 is supported with the side edge support (f) of the jig. The other side edge 8d of the coupler 8 is pressed by the side edge presser (F). The undersides 7a of the claw 7 are supported by the underside supports (d) and (e) of the jig 9 and the end face 3a of the cylinder 3 is pressed by the end face presser (D). Jig 9 is installed with the claw 7 upward. Thus, the machining of the principal portion of the caliper 1, that is the cutting of the cylinder hole 2 of the cylinder, the sealing channel 34, the boot channel 35 and the back relief portion 33 provided in the cylinder hole 2, the cutting of the inner face 8b of the coupler 8 and the inside face 36 of the claw 7 and the boring of the pin supports 5 and 6 and the pin holes 54 and 55 can be made without replacing the jigs. In consequence, inconvenience resulting from the use of a plurality of machining jigs and replacement of one with another on a machining step basis is avoided and caliper machining can be carried out efficiently and automatically.

The machine 37 will be described in more detail. Referring back to FIG. 7, the cutting machine 37 is arranged so that a saddle 42 is axially moved along an axial feed guide 113 on a bed 112 by an axial feed screw 116 rotated by an axial feed servo motor 41 and that the feed unit 44 is vertically moved along a vertical guide 117 for the saddle 42 by a vertical feed screw 120 rotated by a vertical feed servo motor 43. The spindle 50 is rotatably supported by the feed unit 44, whereas a barlike cutter 40 equipped with chips 123 is fitted to the facing head 39 fitted to the spindle 50 so as to move along the radial direction of the spindle 50 because of the function of a facing mechanism 15. The main shaft rotating servo motor 49 and a belt entrainment transmission mechanism 127 for rotating the spindle 50 and the facing head 39 together with the cutter 40 are fitted to the feed unit 44. A driven pulley 128 is used for transmitting a rotational torque solely to the feed unit 44. A key channel 129a of the facing shaft 47 constituting the facing mechanism 15 mates with the key of the driven pulley 128 in such a manner as to move only in the axial direction of the facing shaft 47.

The facing mechanism 15 illustrated in FIGS. 7 and 11 is arranged so as to fit the slider 48 fitted with the cutter 40 into the channel 122a of the facing head 39 and the inclined member 129b of the facing shaft 47 into a wedge channel 130a formed in the slider 48 to move the facing shaft 47 in the axial direction, so that the inclined member 129b is caused to move the slider 48 in the radial direction relative to the axis of the facing head 39 (coaxial with the axis of the spindle 50). A screw feed means 131 is mated with the facing shaft 47 so that the screw feed means allows the facing shaft 47 to rotate only, and a swivel stop lever 132 fitted to the feed unit 44 is mated with the screw feed means 131. Further, a screw 134 rotated by a facing servo motor 45 is engaged with the internal thread 135 of the screw feed means 131. Consequently, the facing shaft 47 is thereby made movable only in the axial direction of the spindle 50 relative to the driven pulley 128, the spindle 50, the facing head 39 and the slider 48 when the facing servo motor 45 is rotated. When the main shaft rotating servo motor 49 is driven, the facing shaft 47 is rotated together with the facing head 39 and the slider 48 mating the facing shaft 47.

The cutting margins of the cylinder hole 2, the boot channel 35, etc. are adjusted as follows. The caliper 1 is set on a workpiece mount 9 with its claw opening 38 upward, its claw 7 close to the facing head 39 and the cylinder 3 far from the facing head 39. The thinnest shank 40a of the cutter 40 is vertically moved into the claw opening 38 with the cutter rotating for the cutting process. The cutter 40 is moved into the cylinder hole 2 by driving the axial feed servo motor 41. The cutter 40 together with the feed unit 44 is centered in alignment with the axis of the cylinder hole 2 by driving the vertical feed servo motor 43. Then, the cutter 40 is located eccentrically relative to the center of rotation of the spindle 50 by driving the facing servo motor 45.

Since servo motors are used as the vertical feed servo motor 43, the axial feed servo motor 41, the facing servo motor 45 and the main shaft rotating servo motor 49 in the embodiment, the cylinder hole 2, the boot channel 35, etc. can automatically be machined based on the program-controlled number of revolutions. In consequence, the indexing operation of the cutter as in the case of the conventional machining method becomes unnecessary, whereby the program control can be implemented.

In addition to the wedge type facing mechanism, a rack may be fitted to the facing shaft, for instance, to cause the slider to move in the radial direction of the facing head by a pinion engaging with the rack; i.e., the mechanism is not limited to what has been illustrated. Moreover, suitable cutter means for each machining step should be used.

The caliper machining method according to the present invention comprises setting the caliper 1 on the workpiece mount 9 with its claw opening 38 upward and employing the vertically movable cutting means equipped with the rotary spindle 50, whereby the cutter 40 is freely moved in and out of the cylinder hole 2 by making use of the claw opening 38. In consequence, it is possible to gain access to and retreat from the cylinder hole 2 while the cutter 40 is rotated and therefore remedy the disadvantage of the conventional machining method in that cutter indexing must be made whenever a a machining step is started and completed. Accordingly, highly efficient cutting becomes possible and this helps implement numerically controlled machining.

As to the caliper 1 set on the workpiece mount 9, calipers 1 as per various specifications can be machined by moving and adjusting the spindle 50 of the cutting machine 37 vertically in accordance with the offset P of the center line C of the cylinder hole 2 with the center line l connecting the left and right pin holes 54 and 55 as a reference position, so that numerically controlled machining is conveniently employed.

Since the facing shaft 47 is allowed only to move in the direction of the length of the shaft relative to the spindle 50 in the foregoing hole cutting machine 37, the rotation preventing type screw feed means 131 must be so arranged as to be free from the rotation of the facing shaft 47 using the bearing 121 and the stop means 132. The disadvantage is that such a complicated combination of members such as the bearing 121 and the rotary stop means 132 should be used in the screw feed means 131. As shown in FIG. 7, a combination of special members required such as the bearing 121 and a hydraulic pressure switch valve is also disadvantageous even in an arrangement wherein the facing shaft 47 is moved in the axial direction using a hydraulic spindle instead of the facing motor 45, the screw 134 and the internal thread 135.

Another embodiment of the present invention is intended to remedy this disadvantage.

Figure 12:
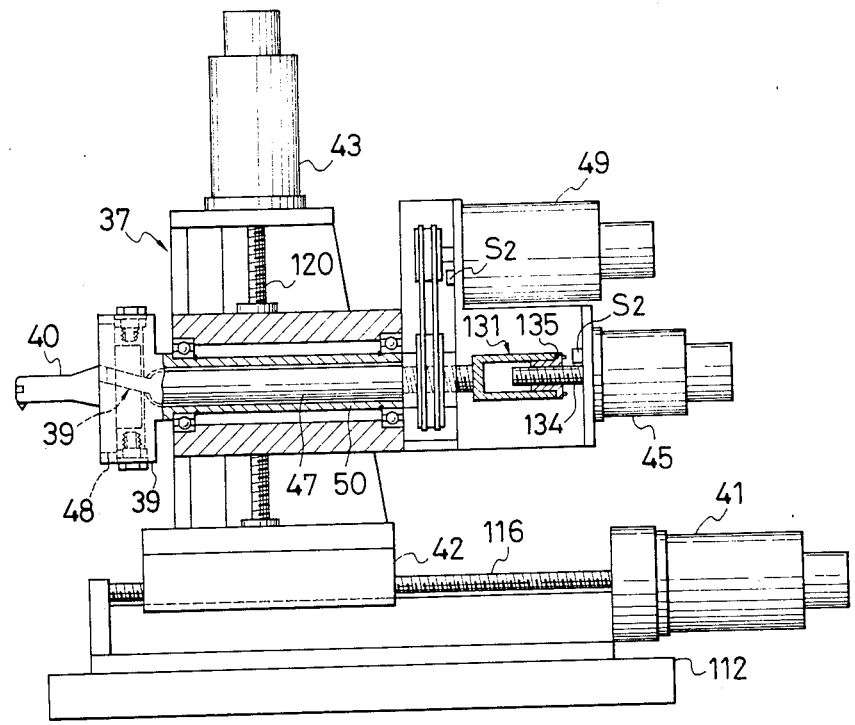
FIG. 12 is a view similar to FIG. 7 but showing another embodiment of the invention.
Figure 13:
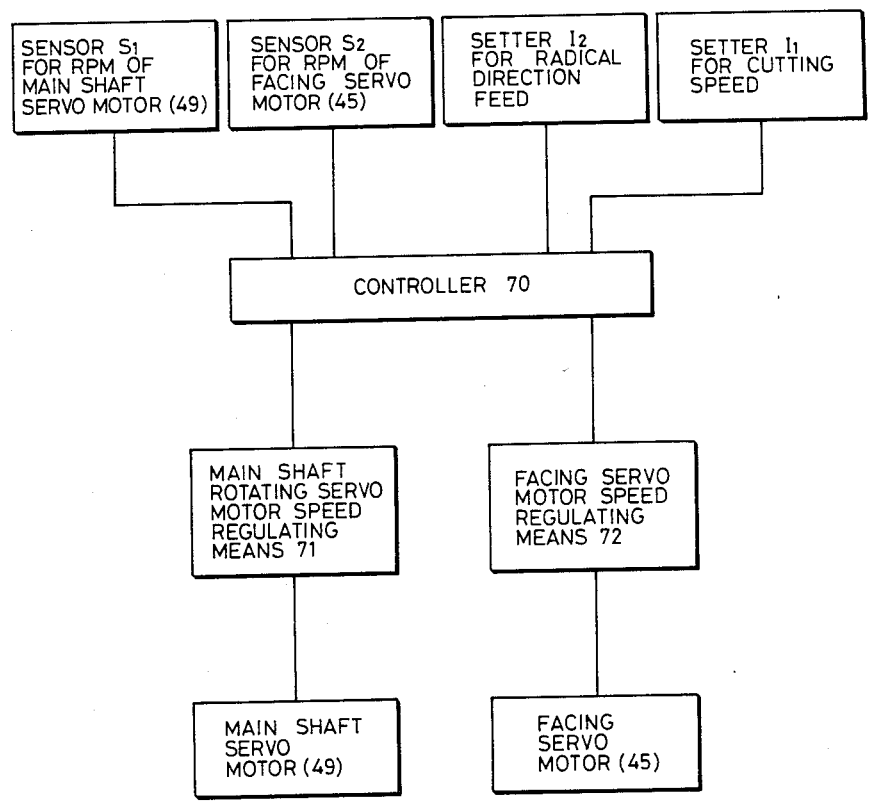
FIG. 13 is a block diagram showing a controller for the apparatus in FIG. 12.

Referring now to FIGS. 12 and 13, a second embodiment of the present invention will be described. In this embodiment, the axial feed screw 116 is driven by the axial feed servo motor 41 and the vertical feed screw 120 is driven by the vertical feed servo motor 43. The transmission mechanism 127 is driven by the main shaft rotating servo motor 49 to engage a ball screw 134, rotated by the facing servo motor 45, with an internal thread 135 of screw mechanism 131 which is fitted to the facing shaft 47. Since the facing mechanism 39 employs what has the same function as that of the aforesaid cutting hole machine 37, the screw function of the screw mechanism 131 is nullified by synchronously rotating the main shaft rotating servo motor 49 and the facing servo motor 45. In this case, the facing shaft 47 is prevented from transversely moving relative to the spindle 50 and therefore the cutter 40 is prevented from moving in the diametrical direction of the facing head 39. However, by asynchronously rotating the facing servo motor 45 relative to the main shaft rotating servo motor 49, the screw mechanism 135 is caused to function by the dimension proportional to the difference in rotation between both the motors 49 and 45. When the facing servo motor 45 rotates at a higher speed than that of the main shaft rotating servo motor 49 in that case, the facing shaft 47 is caused to transversely move toward the facing head 39, for instance, to make the cutter 40 move toward the center of rotation. When the facing servo motor 45 rotates at a lower speed than that of the main shaft rotating servo motor 49, the facing shaft 47 is caused to transversely moves away from the facing head 39 to make the cutter 40 move away from the center of rotation. The feed of the cutter 40 in the radial direction can readily be increased, decreased and adjusted accurately by controlling the number of rotations of motors 49 and 45.

FIG. 13 is a block diagram showing an example of a means for controlling the number of rotations, wherein the number of rotations of the main shaft rotating servo motor 49 and the facing servo motor 45 per unit time is detected using rotary sensors $S_1$ and $S_2$, respectively. A cutting speed setting means $I_1$ and a radial feed setting means $I_2$ are connected to a control means 70 consisting of a microcomputer. The control means 70 is adapted to give a command to a main shaft rotating servo motor speed regulating means 71 so as to adjust its RPM to a level predetermined based on the output of the cutting speed setting means $I_1$ set by the operator. Moreover, the control means 70 computes the RPM of the facing servo motor 45 corresponding to the radial feed inputted based upon the output of the radial feed setting means $I_2$ operated and set by the operator and the above-described set RPM of the main shaft rotating servo motor 49. A command is given to a facing servo motor speed regulating means 72 to adjust the number of rotations to what has been computed.

The main shaft rotating servo motor speed regulating means 71 and the facing servo motor speed regulating means 72 are adapted to amplify the output of the control means 70 and to regulate the speed of rotation of each motor through, e.g., resistance control as in a well known manner.

In the inner diameter machining thus constructed according to this embodiment of the present invention, the cutter 40 is caused to move in the radial direction of the facing head 39 by the dimension proportional to the difference in rotation between both the main shaft rotating servo motor 49 and the facing motor 45 by asynchronously rotating both the motors 49 and 45; i.e., the feed in the radial direction can be increased, decreased and thus adjusted readily and accurately by controlling the RPMs of both the motors 49 and 35. Consequently, complicated members such as the axial feed means 131 for cutting rotation, the bearing 121 and the rotary stop means 132 for preventing the rotation of the facing sleeve 131a with the facing motor 45 as in the first embodiment can be dispensed with according to the present invention, so that an inner diameter machine simple in construction can be provided.

Figure 14:
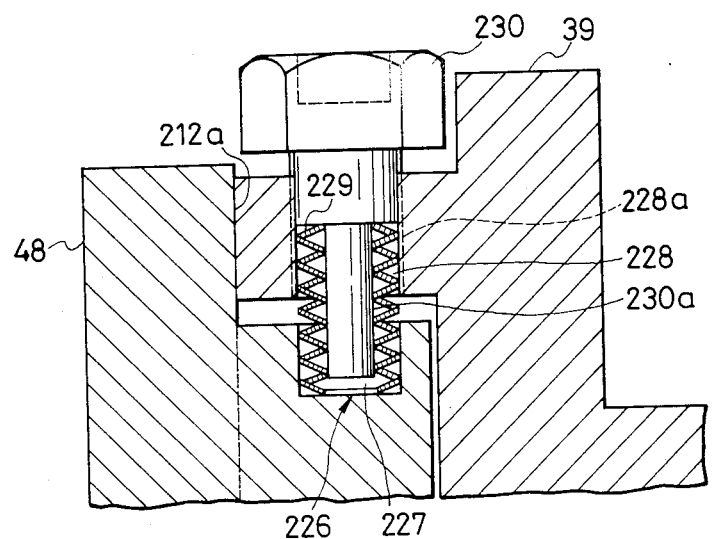
FIG. 14 is a partial cross-sectional view of a pilot pressure mechanism of the invention.

According to another aspect of the present invention, a pilot pressure or prepressure mechanism 226 as shown in FIG. 14 may be provided to restrain the slider 48 from floating in the direction of the channel 212a relative to the facing head 39. FIG. 14 shows an enlarged diagram of the pilot or prepressure mechanism 226 wherein a plurality of cone disc springs 229 are inserted into holes 227 and 228 bored in the slider 48 and the facing head 39. A pilot pressure regulating bolt 230 having a guide pin 230a for being inserted into the holes of the cone disc springs 229 is forced into an internal thread 228a of the hole 228 to make the spring force of the cone disc springs 229 act between the slider 48 and the facing unit 39, so that the inclined member 129b resists the spring force of the cone disc springs 229 and moves along the channel 212a of the slider 48 without floating.

In the inner diameter machining apparatus thus arranged according to the present invention, since the pilot pressure mechanism 226 restrains the slider 48 from floating in the direction of the channel 212a relative to the facing head 39, the slider 48 is caused to move in the diametrical direction relative to the center of rotation of the spindle 50 accurately proportional to the transverse movement of the facing shaft 47 and the cutter 40 is moved in the diametrical direction accurately without floating. Accordingly, numerically controlled machining with the number of rotations of the facing shaft 47 controlled to a predetermined value can be employed and the adoption of automatic machining makes possible accurate and efficient inner diameter machining.

We claim:

1. A caliper machining apparatus for machining a caliper for a disc brake, comprising:
   cutting means for cutting said caliper;
   facing means for positioning and facing said cutting means including a hollow rotary spindle, a facing head fixed to said rotary spindle, a slider movable only in a diametric direction of said facing head, whereby said slider and said cutting means may be slidingly moved in eccentric relation with a rotary center of said rotary spindle, and a facing shaft passing through said rotary spindle, and being rotated therewith but axially movable relative thereto, and translating means for translating means for translating the axial movement of said facing shaft into a transverse movement of said slider
   rotary spindle rotating means for drivingly rotating said rotary spindle;
   facing shaft rotating means coupled to said facing shaft;
   screw means for threadedly coupling said facing shaft rotating means and said facing shaft to each other so that a difference in rotational speed between said facing shaft rotating means and said facing shaft generates axial movement of said facing shaft; and
   asynchoronusly rotating means for generating a difference in rotational speed between said facing shaft rotating means and said rotary spindle whereby said facing shaft is displaced in an axial direction at a rate corresponding to said difference in rotational speed.

2. The apparatus of claim 1, wherein said facing means further includes a pilot pressure mechanism for preventing said slider from floating in a direction other than the diametric direction relative to said facing head.

3. The apparatus of claim 1, wherein said translating means includes an inclined member formed at a front end of said facing shaft and a groove formed in said slider, said inclined member being slidingly engaged with said groove to allow the transverse movement of said slider.

4. The apparatus of claim 2, wherein said pilot pressure mechanism includes a spring means for biasing said slider radially inwardly.

* * * * *